United States Patent
Broumas et al.

(10) Patent No.: US 10,178,087 B2
(45) Date of Patent: Jan. 8, 2019

(54) TRUSTED PIN MANAGEMENT

(71) Applicant: Samsung Electronics Co., Ltd., Suwon-si, Gyeonggi-do (KR)

(72) Inventors: Antonios Dimitrios Broumas, Mountain View, CA (US); An Liu, Mountain View, CA (US); Sia Jeffry Saputra, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/052,131

(22) Filed: Feb. 24, 2016

(65) Prior Publication Data

US 2016/0255073 A1  Sep. 1, 2016

Related U.S. Application Data

(60) Provisional application No. 62/126,056, filed on Feb. 27, 2015.

(51) Int. Cl.
| | |
|---|---|
| *H04L 29/06* | (2006.01) |
| *H04W 12/08* | (2009.01) |
| *G06F 21/31* | (2013.01) |
| *H04L 9/32* | (2006.01) |
| *G06F 21/83* | (2013.01) |
| *G06F 21/84* | (2013.01) |

(52) U.S. Cl.
CPC ............ *H04L 63/083* (2013.01); *G06F 21/31* (2013.01); *G06F 21/83* (2013.01); *G06F 21/84* (2013.01); *H04L 9/3226* (2013.01); *H04L 63/0428* (2013.01); *H04W 12/08* (2013.01)

(58) Field of Classification Search
CPC .......... G06F 21/82; G06F 21/83; G06F 21/84; G06F 21/85; G06F 21/86; G06F 21/87; G06F 21/31; G06F 21/52; H04W 12/08; H04L 9/3226
See application file for complete search history.

(56) References Cited

U.S. PATENT DOCUMENTS

| | | | | |
|---|---|---|---|---|
| 8,473,754 | B2* | 6/2013 | Jones | G06F 21/72 380/277 |
| 9,158,902 | B2* | 10/2015 | Maor | G06F 21/00 |
| 9,418,209 | B2* | 8/2016 | Mangalore | G06F 21/60 |
| 9,686,632 | B2* | 6/2017 | Lindholm | G06F 21/77 |
| 9,713,006 | B2* | 7/2017 | Chastain | H04W 12/04 |
| 2005/0108171 | A1* | 5/2005 | Bajikar | G06F 21/31 705/51 |
| 2011/0003580 | A1* | 1/2011 | Belrose | G06F 21/34 455/410 |

(Continued)

OTHER PUBLICATIONS

Global Platform Inc., "The Trusted Execution Environment", Feb. 2011, White Paper. pp. 1-26.*

*Primary Examiner* — Nelson Giddins
(74) *Attorney, Agent, or Firm* — Jefferson IP Law, LLP

(57) ABSTRACT

An apparatus and method for securing a personal identification number (PIN) on a mobile device are provided. The method may include receiving a request for the PIN from a secure element on the mobile device, instantiating a trusted user interface (TUI), collecting the PIN via the TUI, and securely transmitting the PIN from a trusted execution environment (TEE) associated with the TUI to a secure element (SE).

31 Claims, 7 Drawing Sheets

(56) References Cited

U.S. PATENT DOCUMENTS

| | | | | |
|---|---|---|---|---|
| 2011/0025610 A1* | 2/2011 | Whytock | ............... | G06F 21/83 345/173 |
| 2011/0141953 A1* | 6/2011 | Wright | ............... | H04L 63/123 370/310 |
| 2013/0117573 A1* | 5/2013 | Harbige | ............... | G06F 21/31 713/183 |
| 2013/0254842 A1* | 9/2013 | Jang | ............... | H04L 63/0884 726/3 |
| 2013/0263215 A1* | 10/2013 | Ekdahl | ............... | G06F 21/74 726/2 |
| 2013/0301830 A1* | 11/2013 | Bar-El | ............... | H04L 9/08 380/210 |
| 2014/0075502 A1* | 3/2014 | Aissi | ............... | G06F 21/60 726/1 |
| 2014/0089196 A1* | 3/2014 | Paya | ............... | G06F 21/31 705/44 |
| 2014/0095387 A1* | 4/2014 | Colnot | ............... | G06Q 20/3227 705/44 |
| 2014/0095388 A1* | 4/2014 | Colnot | ............... | G06Q 20/385 705/44 |
| 2014/0095890 A1* | 4/2014 | Mangalore | ............... | G06F 21/10 713/189 |
| 2014/0096222 A1* | 4/2014 | Colnot | ............... | G06F 21/31 726/9 |
| 2014/0173709 A1* | 6/2014 | Eldar | ............... | H04L 9/3226 726/7 |
| 2014/0236842 A1* | 8/2014 | Salminen | ............... | G06Q 20/20 705/75 |
| 2014/0289833 A1* | 9/2014 | Briceno | ............... | H04L 63/08 726/7 |
| 2014/0317686 A1* | 10/2014 | Vetillard | ............... | G06F 21/74 726/2 |
| 2015/0121068 A1* | 4/2015 | Lindemann | ............... | H04L 63/0823 713/158 |
| 2015/0121516 A1* | 4/2015 | Korkishko | ............... | G06F 21/31 726/19 |
| 2015/0161600 A1* | 6/2015 | Kahan | ............... | G06F 3/04886 705/39 |
| 2015/0189496 A1* | 7/2015 | Park | ............... | H04W 8/183 455/418 |
| 2015/0199527 A1* | 7/2015 | Picon | ............... | G06F 21/31 726/26 |
| 2015/0310427 A1* | 10/2015 | Yi | ............... | G06Q 20/385 705/64 |
| 2016/0007190 A1* | 1/2016 | Wane | ............... | H04W 4/50 455/419 |
| 2016/0063490 A1* | 3/2016 | Ziat | ............... | G06Q 20/02 705/71 |
| 2016/0080338 A1* | 3/2016 | Wary | ............... | G06F 21/44 713/171 |
| 2016/0134660 A1* | 5/2016 | Ponsini | ............... | H04L 9/3234 726/1 |
| 2016/0142890 A1* | 5/2016 | Drozdovskyy | ............... | H04W 4/20 455/419 |
| 2016/0188896 A1* | 6/2016 | Zatko | ............... | G06F 21/6218 726/30 |
| 2016/0188897 A1* | 6/2016 | Zatko | ............... | G06F 21/6218 726/28 |
| 2016/0191236 A1* | 6/2016 | Smirnoff | ............... | H04L 63/062 713/171 |
| 2016/0191246 A1* | 6/2016 | Varadarajan | ............... | G06F 9/4406 713/2 |
| 2016/0232335 A1* | 8/2016 | Violleau | ............... | G06F 21/30 |
| 2016/0232521 A1* | 8/2016 | Sharp | ............... | G06Q 20/02 |
| 2016/0234022 A1* | 8/2016 | Motika | ............... | H04L 9/3213 |
| 2016/0234176 A1* | 8/2016 | Chu | ............... | H04L 63/0428 |
| 2016/0241402 A1* | 8/2016 | Gordon | ............... | H04L 9/3228 |
| 2016/0316372 A1* | 10/2016 | Daksiewicz | ............... | H04W 12/08 |
| 2017/0085589 A1* | 3/2017 | Rizzo | ............... | H04L 63/0428 |
| 2017/0180136 A1* | 6/2017 | Ibasco | ............... | H04L 9/3226 |
| 2017/0374070 A1* | 12/2017 | Shah | ............... | H04L 63/20 |

* cited by examiner

TRUSTED PIN MANAGEMENT

CROSS-REFERENCE TO RELATED APPLICATION

This application claims the benefit under 35 U.S.C. § 119(e) of a U.S. Provisional application filed on Feb. 27, 2015 in the U.S. Patent and Trademark Office and assigned Ser. No. 62/126,056, the entire disclosure of which is hereby incorporated by reference.

TECHNICAL FIELD

The present disclosure relates to an apparatus and method for securely managing the collection and transmission of a Personal Identification Number (PIN). More particularly, the present disclosure relates to an apparatus and method for protecting PINs using a trusted user interface (TUI) accessible only in a Trusted Execution Environment (e.g., an ARM TrustZone®).

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Applications accessing a card are executed in a normal world (e.g., a non-trusted execution environment) and are susceptible to a variety of attacks that may result in user personal identification number (PIN) leakage.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for securely managing the collection and transmission of a Personal Identification Number (PIN).

In accordance with an aspect of the present disclosure, a method for securing a personal identification number (PIN) on a mobile device is provided. The method may include receiving a request for the PIN from a secure element on the mobile device, instantiating a trusted user interface (TUI), collecting the PIN via the TUI, and securely transmitting the PIN from a trusted execution environment (TEE) associated with the TUI to a secure element (SE).

In accordance with another aspect of the present disclosure, an apparatus for securing a personal identification number (PIN) on a mobile device is provided. The apparatus may include memory in a trusted execution environment (TEE) on the mobile device and the memory configured to store executable instructions for securing the PIN. The apparatus may further include a secure element (SE) associated with the mobile device, and a processor in the TEE on the mobile device, wherein the processor is configured to execute the stored instructions to receive a request for the PIN from the secure element on the mobile device, instantiate a trusted user interface (TUI), collect the PIN via the TUI, and securely transmit the PIN from the TEE to the SE.

In accordance with another aspect of the present disclosure, a non-transitory computer-readable storage medium storing instructions for securing a personal identification number (PIN) on a mobile device is provided. The non-transitory computer-readable storage medium may store instructions that, when executed, cause at least one processor to receive a request for a personal identification number (PIN) from a secure element on a mobile device, instantiate a trusted user interface (TUI), collect the PIN via the TUI, and securely transmit the PIN from a trusted execution environment (TEE) associated with the TUI to a secure element (SE).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
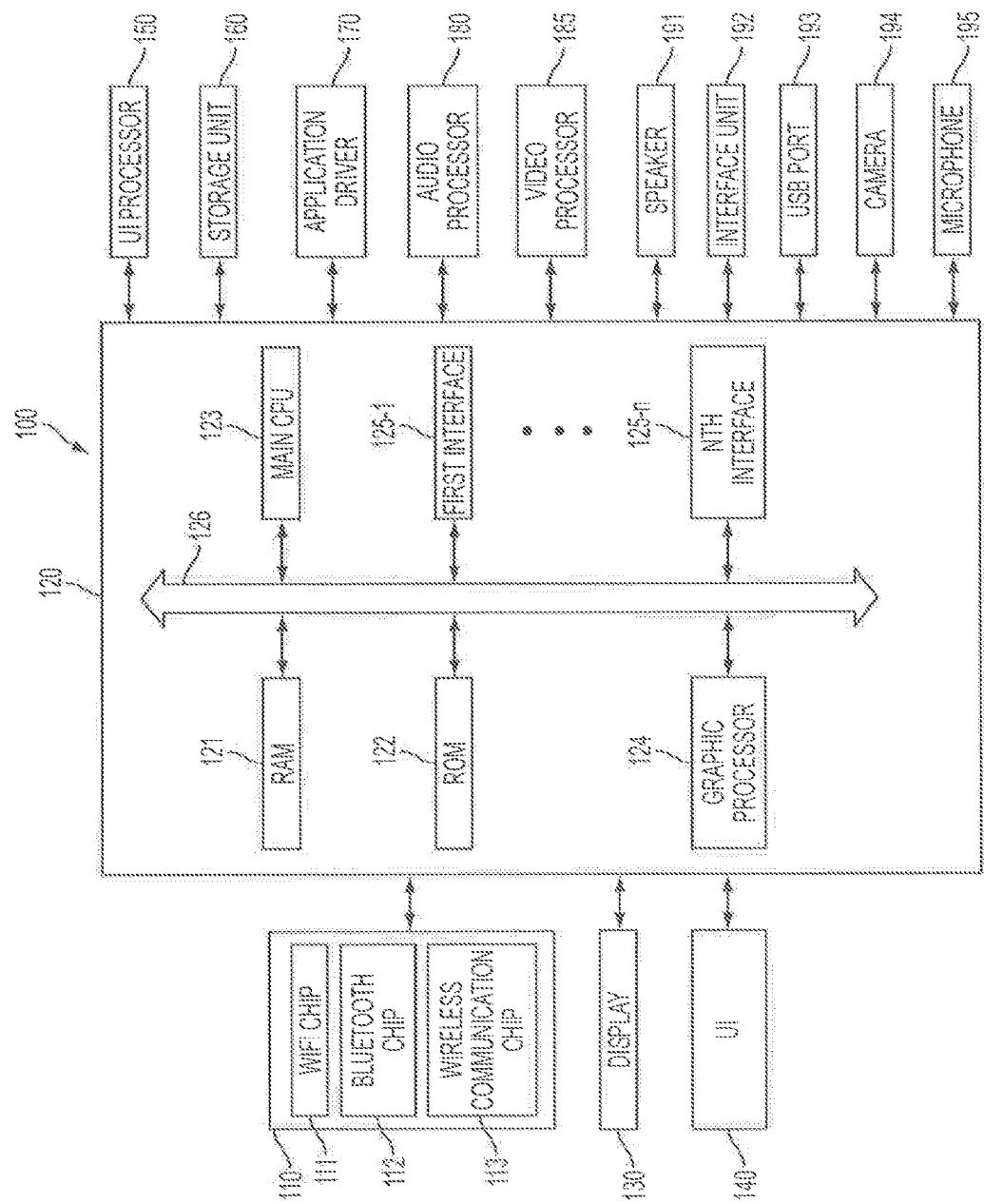
FIG. 1 illustrates a block diagram of the terminal device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for managing a trusted PIN.

Various embodiments of the present disclosure include an apparatus and method for adding security to a mobile telephone.

Various aspects of the present disclosure incorporate a Trusted User Interface (TUI) for PIN entry and restrict access to an unencrypted PIN to a Trusted Execution Environment.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

FIG. 1 illustrates a block diagram of the terminal device according to various embodiments of the present disclosure.

Referring to FIG. 1, the user terminal device 100 includes a communication device 110, the controller 120, the display 130, a user interface (UI) 140, a UI processor 150, a storage unit 160, an application driver 170, an audio processor 180, a video processor 185, a speaker 191, an interface unit 192, a USB port 193, a camera 194, and a microphone 195.

The communication device 110 performs communication functions with various types of external apparatuses. The communication device 110 may include various communication chips such as a Wireless Fidelity (WiFi) chip 111, a Bluetooth® chip 112, a wireless communication chip 113, and so forth. The WiFi chip 111 and the Bluetooth® chip 112 perform communication according to a WiFi standard and a Bluetooth® standard, respectively. The wireless communication 113 chip performs communication according to various communication standards such as Zigbee®, 3rd Generation (3G), 3rd Generation Partnership Project (3GPP), Long Term Evolution (LTE), and so forth. In addition, the communication device 110 may further include an Near Field Communication (NFC) chip that operates according to a NFC method by using bandwidth from various RF-ID frequency bands such as 135 kHz, 13.56 MHz, 433 MHz, 860~960 MHz, 2.45 GHz, and so on.

The operation of the controller 120 reads a computer readable medium and performs instructions according to the computer readable medium, which is stored in the storage unit 160. The storage unit 160 may also store various data such as Operating System (O/S) software, applications, multimedia content (e.g., video files, music files, etc.), user data (documents, settings, etc.), and so forth.

Other software modules which are stored in the storage unit 160 will be described later with reference to FIG. 1.

The UI 140 is an input device configured to receive user input and transmit a user command corresponding to the user input to the controller 120. For example, the UI 140 may be implemented by any suitable input such as touch pad, a key pad including various function keys, number keys, special keys, text keys, or a touch screen, for example. In some embodiments, UI 140 may be a TUI implemented as part of or securely integrated with a secure environment (e.g., a trusted execution environment). Accordingly, the UI 140 receives various user commands. For example, the UI 140 may receive a PIN entry.

The UI processor 150 may process and generate various UI screens in 2D or 3D form. Herein, the UI screen may be a screen which is associated with the execution of the integrated wish-list application as described above. In addition, the UI screen may be a screen which displays text or diagrams such as a menu screen, a warning sentence, a time, a channel number, etc.

Further, the UI processor 150 may perform operations such as 2D/3D conversion of UI elements, adjustment of transparency, color, size, shape, and location, highlights, animation effects, and so on.

The storage unit 160 is a storage medium that stores various computer readable mediums that are configured to operate the user terminal device 100, and may be realized as any suitable storage device such as a Hard Disk Drive (HDD), a flash memory module, and so forth. For example, the storage unit 160 may comprise a Read Only Memory (ROM) for storing programs to perform operations of the controller 120, a Random Access Memory (RANI) 121 for temporarily storing data of the controller 120, and so forth. In addition, the storage unit 160 may further comprise Electrically Erasable and Programmable ROM (EEPROM) for storing various reference data.

The application driver 170 executes applications that may be provided by the user terminal device 100. Such applications are executable and perform user desired functions such as playback of multimedia content, messaging functions, communication functions, display of data retrieved from a network, and so forth.

The audio processor 180 is configured to process audio data for input and output of the user terminal device 100. For example, the audio processor 180 may decode data for playback, filter audio data for playback, encode data for transmission, and so forth.

The video processor 185 is configured to process video data for input and output of the user terminal device 100. For example, the video processor 185 may decode video data for playback, scale video data for presentation, filter noise, convert frame rates and/or resolution, encode video data input, and so forth.

The speaker 191 is provided to output audio data processed by the audio processor 180 such as alarm sounds, voice messages, audio content from multimedia, audio content from digital files, and audio provided from applications, and so forth.

The interface unit 192 may be configured based on the user terminal device 100 and include any suitable input mechanism such as a mechanical button, a touch pad, a wheel, and so forth. The interface unit 192 is generally on a particular position of the user terminal device 100, such as on the front, side, or rear of the external surface of the main body. For example, a button to turn the user terminal device 100 on and off may be provided on a side.

The USB port 193 may perform communication with various external apparatuses through a USB cable or perform recharging. In other examples, suitable ports may be included to connect to external devices such as an 802.11 Ethernet port, a proprietary connector, or any suitable connector associated with a standard to exchange information.

The camera 194 may be configured to capture (i.e., photograph) an image as a photograph or as a video file (i.e., movie). The camera 194 may include any suitable number of cameras in any suitable location. For example, the user terminal device 100 may include a front camera and rear camera.

The microphone 195 receives a user voice or other sounds and converts the same to audio data. The controller 120 may use a user voice input through the microphone 195 during an audio or a video call, or may convert the user voice into audio data and store the same in the storage unit 160.

When the camera 194 and the microphone 195 are provided, the controller 120 may receive based on a speech input into the microphone 195 or a user motion recognized by the camera 194. Accordingly, the user terminal device 100 may operate in a motion control mode or a voice control mode. When the user terminal device 100 operates in the motion control mode, the controller 120 captures images of a user by activating the camera 194, determines if a particular user motion is input, and performs an operation according to the input user motion. When the user terminal device 100 operates in the voice control mode, the controller 120 analyzes the audio input through the microphone and performs a control operation according to the analyzed audio.

In addition, various external input ports are provided to connect to various external terminals such as a headset, a mouse, a Local Area Network (LAN), etc., may be further included.

Generally, the controller 120 controls overall operations of the user terminal device 100 using computer readable mediums that are stored in the storage unit 160.

For example, the controller 120 may initiate an application stored in the storage unit 160, and execute the application by displaying a UI to interact with the application. In other examples, the controller 120 may playback media content stored in the storage unit 160 and may communicate with external apparatuses through the communication device 110.

Specifically, the controller 120 comprises a RAM 121, a ROM 122, a main CPU 123, a graphic processor 124, a first to nth interfaces 125-1~125-n, and a bus 126. In some examples, the components of the controller 120 may be integral in a single packaged integrated circuit. In other examples, the components may be implemented in discrete devices (e.g., the graphic processor 124 may be a separate device).

The RAM 121, the ROM 122, the main CPU 123, the graphic processor 124, and the first to nth interfaces 125-1~125-n may be connected to each other through a bus 126.

The first to nth interfaces 125-1~125-n are connected to the above-described various components. One of the interfaces may be a network interface which is connected to an external apparatus via the network.

The main CPU 123 accesses the storage unit 160 and to initiate a booting process to execute the O/S stored in the storage unit 160. After booting the O/S, the main CPU 123 is configured to perform operations according to software modules, contents, and data stored in the storage unit 160.

The ROM 122 stores a set of commands for system booting. If a turn-on command is input and power is supplied, the main CPU 123 copies an O/S stored in the storage unit 160 onto the RAM 121 and boots a system to execute the O/S. Once the booting is completed, the main CPU 123 may copy application programs in the storage unit X60 onto the RAM X21 and execute the application programs.

The graphic processor 124 is configured to generate a screen including objects such as, for example an icon, an image, and text using a computing unit (not shown) and a rendering unit (not shown). The computing unit computes property values such as coordinates, shape, size, and color of each object to be displayed according to the layout of the screen using input from the user. The rendering unit generates a screen with various layouts including objects based on the property values computed by the computing unit. The screen generated by the rendering unit is displayed by the display 130.

Albeit not illustrated in the drawing, the user terminal device 100 may further comprise a sensor (not shown) configured to sense various manipulations such as touch, rotation, tilt, pressure, approach, etc. with respect to the user terminal device 100. In particular, the sensor (not shown) may include a touch sensor that senses a touch that may be realized as a capacitive or resistive sensor. The capacitive sensor calculates a touch coordinates by sensing microelectricity provided when the user touches the surface of the display 130, which includes a dielectric coated on the surface of the display 130. The resistive sensor comprises two electrode plates that contact each other when a user touches the screen, thereby allowing electric current to flow to calculate the touch coordinates. As such, a touch sensor may be realized in various forms. In addition, the sensor may further include additional sensors such as an orientation sensor to sense a rotation of the user terminal device 100 and an acceleration sensor to sense displacement of the user terminal device 100.

FIG. 1 illustrates an example of specific elements included in the terminal device 100. However, components the terminal device 100 may be added, omitted, or changed according to the configuration of terminal device 100. For example, a Global Positioning System (GPS) receiver (not shown) to receive a GPS signal from GPS satellite and calculate the current location of the user terminal device 100, and a Digital Multimedia Broadcasting (DMB) receiver (not shown) to receive and process a DMB signal may be further included.

Figure 2:
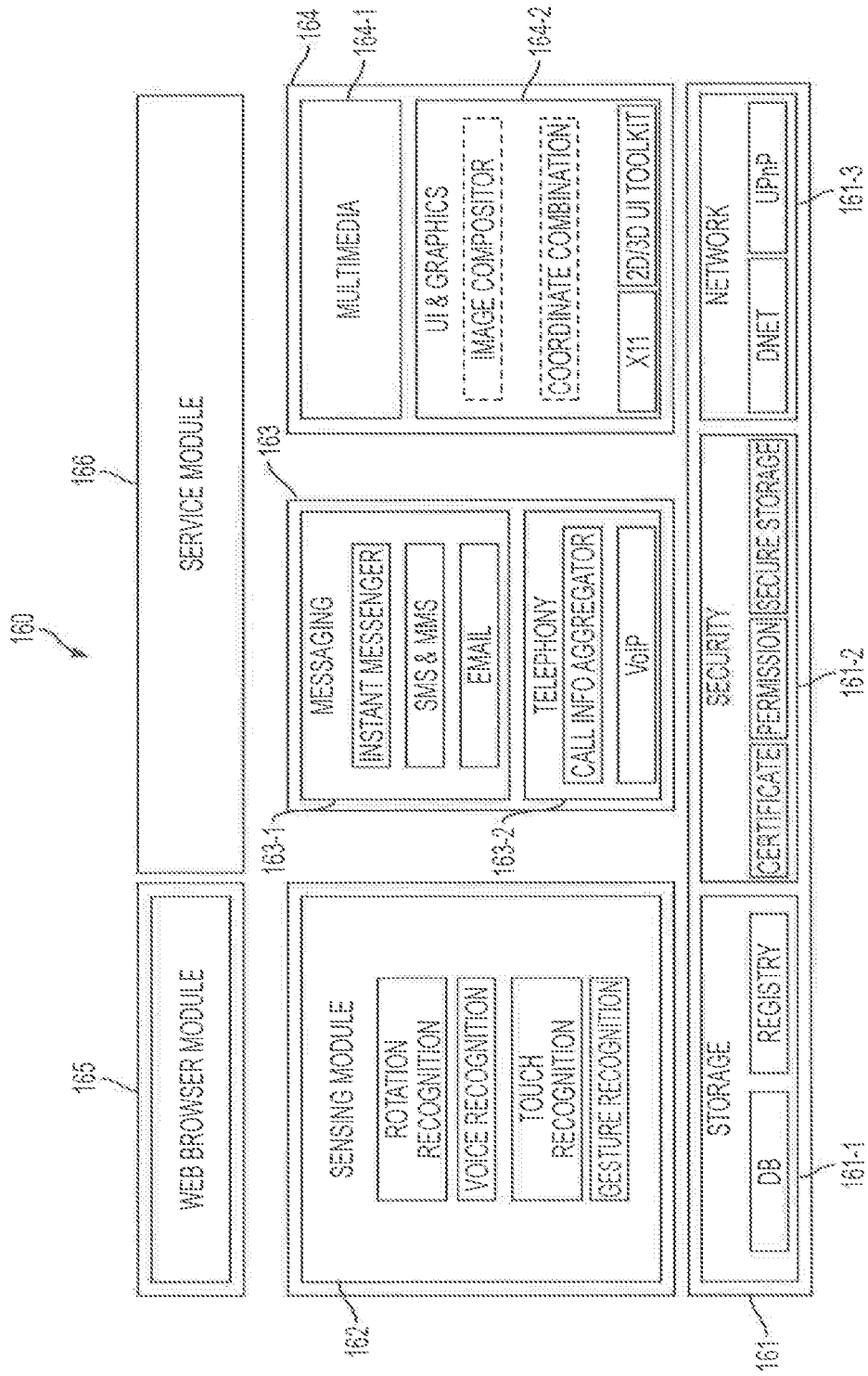
FIG. 2 illustrates a block diagram of software modules in a storage unit 160 according to various embodiments of the present disclosure.

FIG. 2 is a block diagram of software modules in a storage unit 160 according to an embodiment of the present disclosure.

Referring to FIG. 2, the storage unit 160 may store software including a base module 161, a sensing module 162, a communication module 163, a presentation module 164, a web browser module 165, and a service module 166.

The base module 161 refers to a basic module which processes a signal transmitted from hardware included in the user terminal device 100 and transmits the processed signal to an upper layer module. The base module 161 includes a storage module 161-1, a security module 161-2, and a network module 161-3. The storage module 161-1 is a program module including database or registry. The main CPU 123 may access a database in the storage unit 160 using the storage module 161-1 to read out various data. The security module 161-2 is a program module which supports certification, permission, secure storage, etc. with respect to hardware, and the network module 161-3 is a module which supports network connections, and includes a DNET module, a Universal Plug and Play (UPnP) module, and so on.

The sensing module 162 collects information from various sensors, analyzes the collected information, and manages the collected information. The sensing module 162 may include suitable modules such as a face recognition module, a voice recognition module, a touch recognition module, a motion recognition (i.e., gesture recognition) module, a rotation recognition module, and an NFC recognition module, and so forth.

The communication module 163 performs communication with other devices. The communication module 163 may include any suitable module according to the configuration of the user terminal device 100 such as a messaging module 163-1 (e.g., a messaging application), a Short Message Service (SMS) & a Multimedia Message Service (MMS) module, an e-mail module, etc., and a call module 163-2 that includes a call information aggregator program module, a VoIP module, and so forth.

The presentation module 164 composes an image to display on the display 130. The presentation module 164 includes suitable modules such as a multimedia module 164-1 and a UI rendering module 164-2. The multimedia module 164-1 may include suitable modules for generating and reproducing various multimedia contents, screens, and sounds. For example, the multimedia module 164-1 includes a player module, a camcorder module, a sound processing module, and so forth. The UI rendering module 164-2 may include an image compositor module for combining images, a coordinates combination module for combining and generating coordinates on the screen where an image is to be displayed, an X11 module for receiving various events from hardware, a 2D/3D UI toolkit for providing a tool for composing a UI in 2D or 3D form, and so forth.

The web browser module 165 accesses a web server to retrieve data and displays the retrieved data in response to a user input. The web browser module 165 may also be configured to transmit user input to the web server. The web browser module 165 may include suitable modules such as a web view module for composing a web page according to the markup language, a download agent module for downloading data, a bookmark module, a web-kit module, and so forth.

The service module 166 is a module including applications for providing various services. Specifically, the service module 166 may include program modules such as a navigation program, a content reproduction program, a game program, an electronic book program, a calendar program, an alarm management program, other widgets, and so forth.

FIG. 2 illustrates various program modules, but some of the various program modules may be omitted, changed, or added according to the configuration of the user terminal device 100. For example, a location-based module which supports a location-based service in association with hardware such as a GPS receiver may be further included. In another example, a camera 194 may not be included because the user terminal device 100 is configured for a high-security location.

Figure 3:
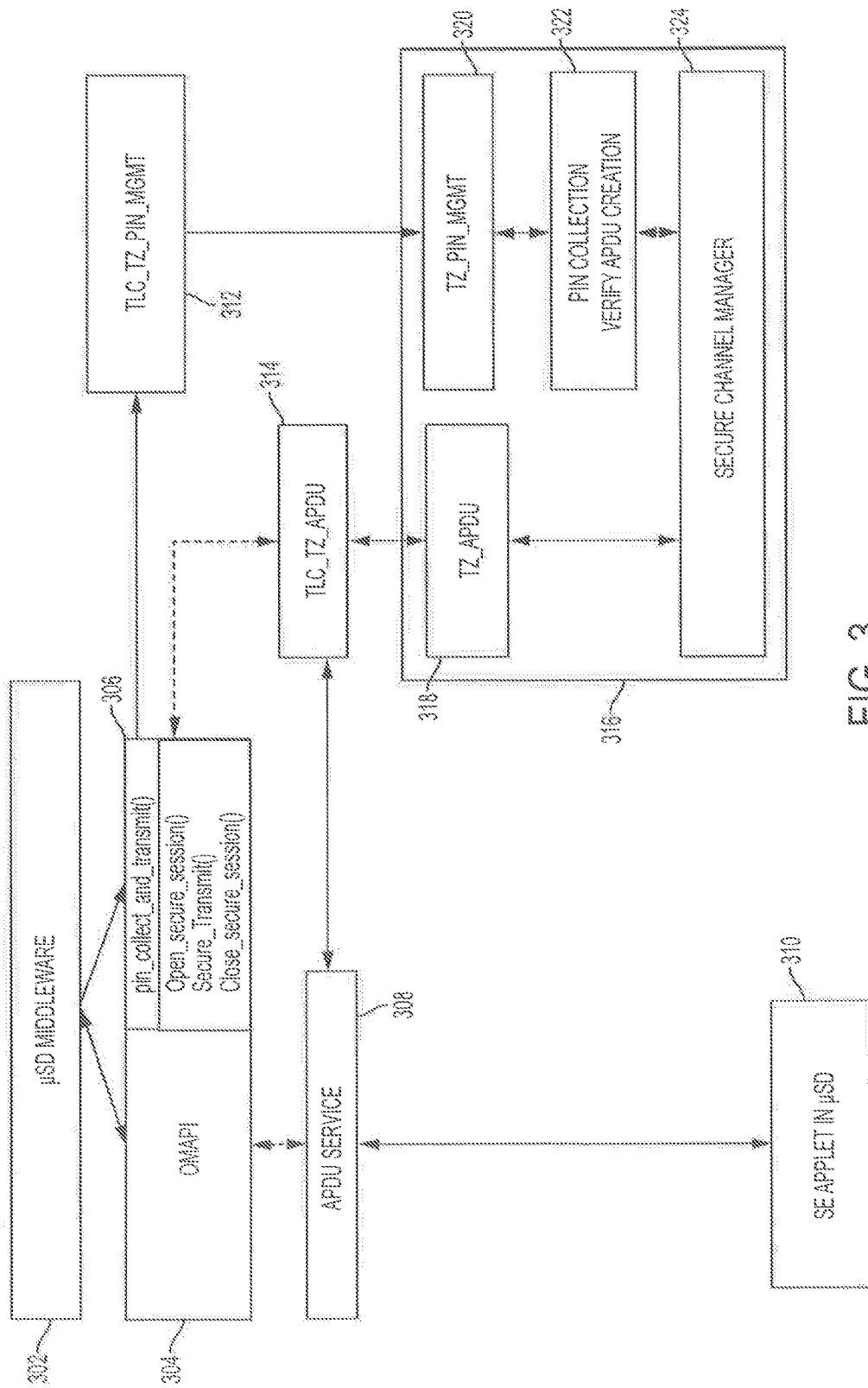
FIG. 3 illustrates a Secure Open Mobile Application Programming Interface for Personal Identification Number management, according to various embodiments of the present disclosure.

FIG. 3 illustrates Personal Identification Number management using a Secure Open Mobile Application Programming Interface (OMAPI), according to embodiments of the present disclosure.

As depicted in FIG. 3, a PIN may be securely communicated between a secure element (SE) 310 and trusted execution environment (TEE) 316. A SE may include, for example, one or more of a process running in a microSD (secure digital non-volatile memory card), a process running in a trusted execution environment of the mobile device, a process resident on a subscriber identity module (SIM) card, a process resident on a universal integrated circuit card (UICC), an embedded security chip, and a process resident on a secured physical card. For example, SE 310 may be a secure applet running on a microSD card. In some embodiments, SE 310 may communicate with the TEE 316 using an application protocol data unit (APDU) which may be transmitted using APDU service 308. APDU service 308 may interface via OMAPI 304 to middleware 302 (e.g., microSD middleware). Middleware 302 may provide an interface for applications on a user device to access SE 310 via OMAPI 304 and APDU service 308. As illustrated, OMAPI extensions 306 may provide access from OMAPI 304 to TEE 316 via interfaces TLC_TZ_APDU 314 and TLC_TZ_PIN_MGMT 312. The OMAPI extensions 306 may allow secure pin management without disrupting normal communications between applications accessing middleware 302 to communicate with SE310.

TEE 316 may contain components TZ-APDU 318, TZ_PIN_PIN_MGMT 320, PIN and APDU component 322, and secure channel manager 324. TEE 316 may be a secure environment which may use a secure O/S, dedicated secure hardware, and/or other security measures (e.g., an ARM® TrustZone®). Inside of TEE 316 or possibly a securely connected trusted user interface (TUI) may be the only place where an unencrypted PIN is inside of a mobile device.

In some embodiments, PIN and APDU component 322 may be a trusted user interface (TUI) or may securely interface with a TUI (e.g., via a secure hardware channel, via an encrypted and secure connection, etc.). PIN and APDU component 322 may be used to collect a PIN (e.g., via a TUI) in response to a request from interface TZ_PIN_MGMT 320. PIN and APDU component 322 may pass an unencrypted PIN received from a TUI to secure channel manager 324 for encryption. PIN and APDU component 322 may also verify the creation of application protocol data units (APDU) received from or to be transmitted by interface TZ_APDU 318. Secure channel manager 324 may ensure that a PIN is encrypted prior to transmission to an SE. Secure channel manager 324 may also ensure that a channel between the TEE 316 and SE 310 is secure. Secure channel manager 324 may use one or more components and/or protocols to ensure security (e.g., a GlobalPlatform® SCP protocol (for example, SCP 02, 03, 10, and/or 11), public key or shared key encryption, an APDU, and/or a secure channel).

As illustrated in FIG. 3, a PIN (either encrypted or unencrypted) may never reach an application operating in the normal world (e.g., outside of the TEE and SE). An encrypted PIN may be transmitted by secure channel manager 324 via TZ_APDU 318 and APDU service 308 to SE 310. Secure session requests and requests for a PIN may be handled, in response to a request from middleware 302, by OMAPI extensions 306 via interface TLC_TZ_PIN_MGMT 312 to PIN and APDU component 322. Secure channel manager 324 may facilitate establishment of a secure channel (e.g., using a secure channel protocol (SCP) such as SCP 02 or SCP 03). A shared key may be provisioned to both TEE 316 and SE 310.

A PIN which may control access to the secure element may be protected from Normal World threats and the PIN may be as secure as the Trusted User Interface and TEE (e.g., TrustZone) implementation allows. This may apply for different types of Secure Elements (e.g., external to a mobile device such as guarded in a physical card, software based, resident in a SIM card, in a microSD, or of an embedded secure element type).

An exemplary OMAPI extension may include a portion in a normal world. For example:

```
OMAPI_RESULT omapi_channel_pin_collect_and_transmit(
    OMAPI_HANDLE  channel,
    Int           assemblerID,
    Byte *        pPreCommand,
    Int           preCmdLength,
    Byte *        pResponse,
    Int *         pRspLength);
```

An interface for an OMAPI extension may also be implemented in a secure world. For example:

```
Int assembler(
    Byte * pPIN,
    Int    pinLength,
    Byte * pPreCommand,
    Int    preCmdLength,
    Byte * pCommand,
    Int *  pCmdLength);
```

Figure 4:
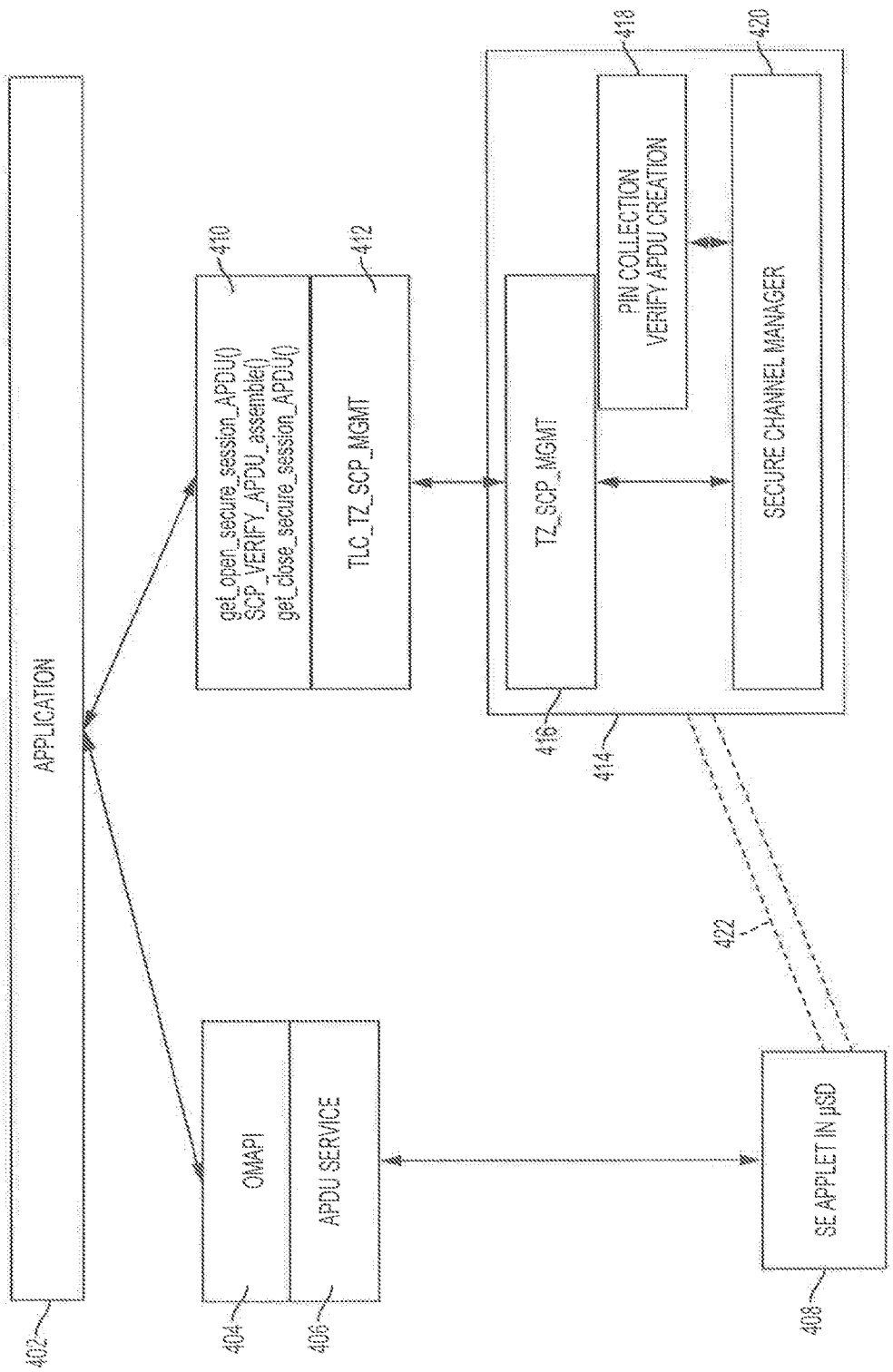
FIG. 4 is a block diagram depicting delegated secure channel protocol management and PIN management, according to various embodiments of the present disclosure.

FIG. 4 is a block diagram depicting delegated secure channel protocol management and PIN management, according to various embodiments of the present disclosure. SE 408 may be similar to SE 310. SE 408 may communicate with an application 402 in the normal world via APDU service 406 and OMAPI 404. APDU service 406 and OMAPI 404 may communicate with TEE 414 via application 402 and interface TLZ_TZ_SCP_MGMT 412. Interface TLZ_TZ_SCP_MGMT 412 may provide callable methods 410 to application 402. TEE 414 may contain interface TZ_SCP_MGMT 416, secure channel manager 420 and PIN and APDU component 418. PIN and APDU component 418 may be similar to PIN and APDU component 322, and may contain or securely interface with a TUI for PIN collection. PIN and APDU component 418 may also verify APDU creation by secure channel manager 420.

Secure channel manager 420 may encrypt a PIN received from PIN and APDU component 418 prior to transmission to SE 408. A PIN may not be transmitted via application 402, but may be transmitted via a secure channel (not shown) directly from secure channel manager 420 to SE 408. A secure channel may use a secure hardware channel or may be established using encryption. In some embodiments, secure channel manager 420 may receive a nonce from SE 408 (e.g., via APDU service 406, OMAPI 404, application 402, and interfaces 412 and 416). Secure channel manager 420 may transmit the nonce to SE 408 via the secure channel prior to or with transmission of an encrypted PIN. Secure channel manager 42—may use one or more components and/or protocols to ensure security (e.g., a GlobalPlatform® SCP protocol (for example, SCP 02, 03, 10, and/or 11), public key or shared key encryption, an APDU, and/or a secure channel).

As illustrated in FIG. 4, a PIN (either encrypted or unencrypted) may never reach an application operating in the normal world (e.g., outside of the TEE and SE), if there is direct link between TEE and SE (e.g., optional direct secure channel 422). An encrypted PIN may be transmitted by secure channel manager 420 via a secure channel to SE 408. Secure session requests and requests for a PIN may be handled, in response to a request from application 420 via callable methods 410, by interfaces 412 and 416 to secure channel manager 420. Secure channel manager 420 may facilitate establishment of a secure channel (e.g., using a secure channel protocol (SCP) such as SCP 02 or SCP 03). A shared key may be provisioned to both TEE 414 and SE 408.

A PIN which may control access to the secure element may be protected from Normal World threats and the PIN may be as secure as the Trusted User Interface and TEE (e.g., TrustZone) implementation allows. This may apply for different types of Secure Elements (e.g., external to a mobile device such as guarded in a physical card, software based, resident in a SIM card, in a microSD, or of an embedded secure element type).

Figure 5:
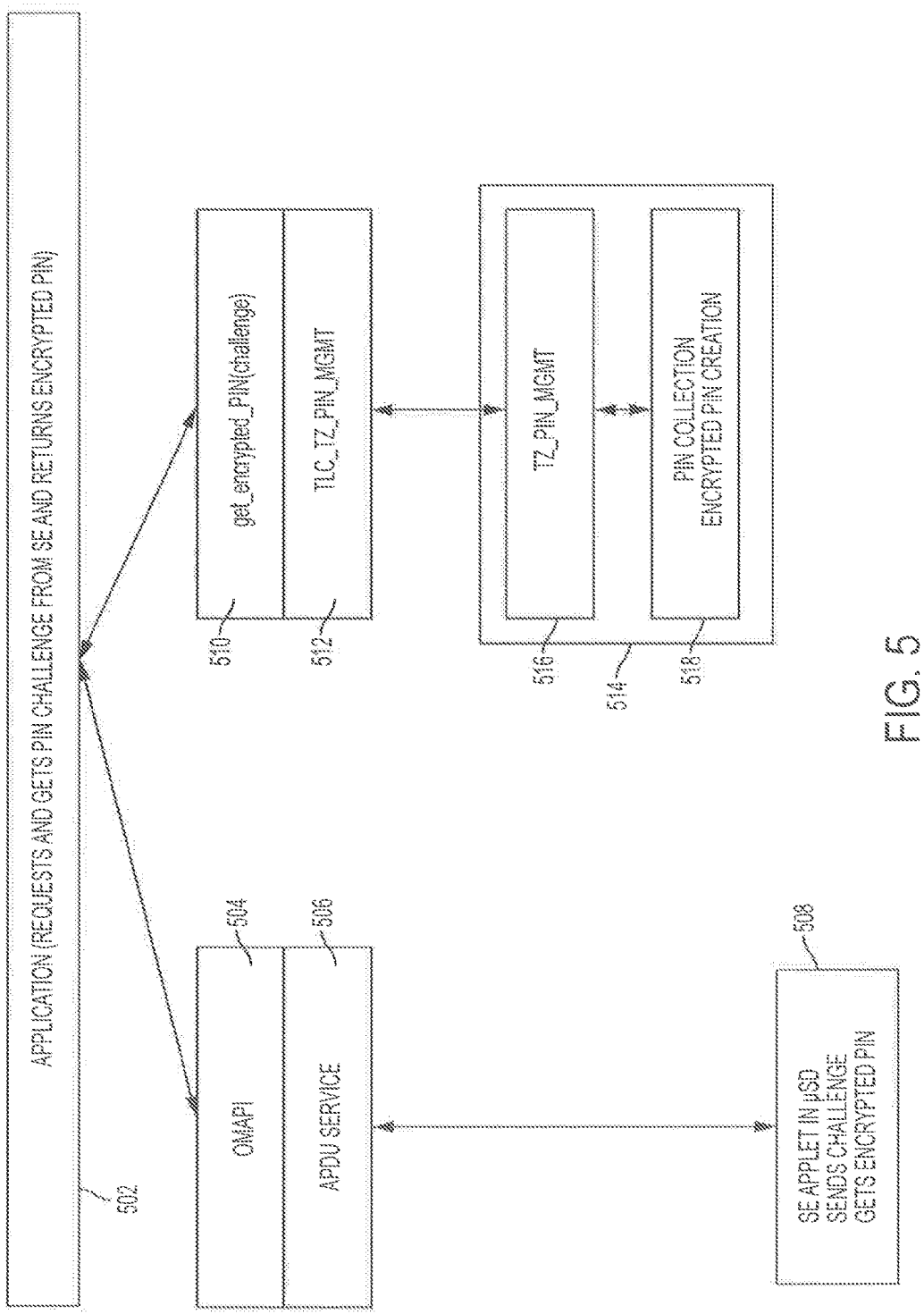
FIG. 5 is a block diagram illustrating secure PIN management using public key cryptography standards (PKCS), according to various embodiments of the present disclosure.

FIG. 5 is a block diagram illustrating secure PIN management using public key cryptography standards (PKCS), according to various embodiments of the present disclosure. SE 508 may be similar to SE 408. SE 508 may communicate with an application 502 in the normal world via APDU service 506 and OMAPI 504. APDU service 506 and OMAPI 504 may communicate with TEE 514 via application 502 and interface TLZ_TZ_PIN_MGMT 512. Interface TLZ_TZ_PIN_MGMT 512 may provide callable methods 510 to application 502. TEE 514 may contain interface TZ_PIN_MGMT 516 and PIN collection and encryption component 518. PIN collection and encryption component 518 may contain or securely interface with a TUI for PIN collection. PIN collection and encryption component 518 may also encrypt a PIN received from a TUI.

A PIN may be received and transmitted via application 502 only in encrypted form. Application 502 may receive an encrypted PIN from TEE 514 and may transmit the encrypted PIN to SE 508. In some embodiments, TEE 514 may receive a nonce from SE 508 (e.g., via APDU service 506, OMAPI 504, application 502, and interfaces 512 and 516). TEE 514 may transmit the nonce in encrypted form to SE 508 prior to or with transmission of an encrypted PIN.

According to some embodiments, application 502 may need access to SE 508 for some secure functionality (e.g., payment, access to secure data, etc.). Application 502 may request a PIN challenge from SE 508 via OMAPI 504 and APDU service 506. For example, application 502 may use a public key cryptography standard (PKCS) (e.g., PKCS 11). SE 508 may send a nonce to TEE 514 and may receive the nonce and an encrypted PIN from TEE 514 in response.

Prior to receiving a request from the application 502, SE 508 may create or offline obtain a public-private key pair (e.g., a public-private key pair may be provisioned). SE 508 may send out the SE public key. The SE public key may be installed in TEE 514 (e.g., a TrustZone).

An encrypted PIN may be transmitted securely to SE 508. Requests for a PIN may be handled, in response to a request from application 502, by interfaces 512 and 516 to PIN collection and encryption component 518. PIN collection and encryption component 518 may facilitate establishment of a secure channel (e.g., using a public key and SCP 10 or 11). A public key may be distributed by SE 508 to PIN collection and encryption component 518. PIN collection and encryption component 518 may use the public key of SE 508 to encrypt the PIN. This method may require only one way security from TEE 514 to the SE 508.

A PIN which may control access to the secure element may be protected from Normal World threats and the PIN may be as secure as the Trusted User Interface and TEE (e.g., TrustZone) implementation allows. This may apply for different types of Secure Elements (e.g., external to a mobile device such as guarded in a physical card, software based, resident in a SIM card, in a microSD, or of an embedded secure element type).

Figure 6:
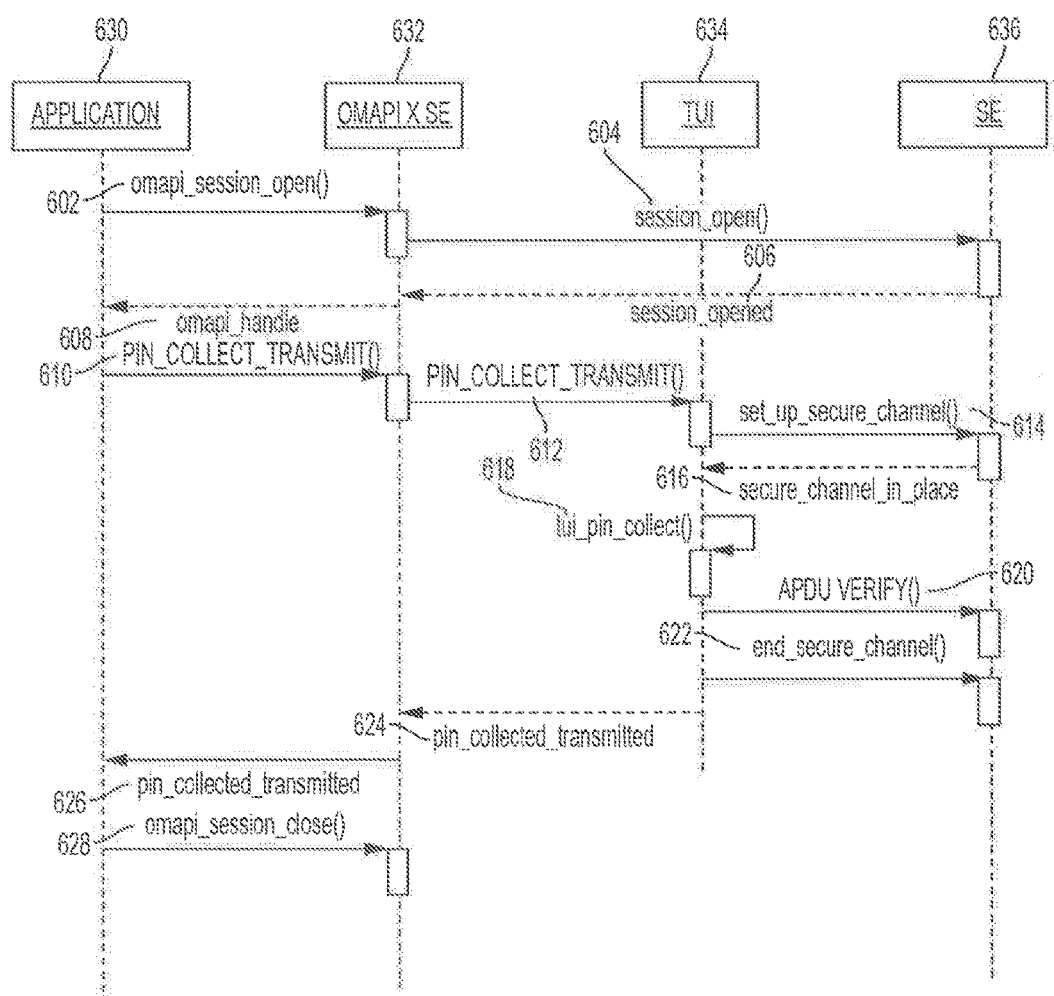
FIG. 6 illustrates flowchart for Personal Identification Number management using an extension to an Open Mobile Application Programming Interface, according to various embodiments of the present disclosure.

FIG. 6 illustrates a flowchart for Personal Identification Number management using an extension to an Open Mobile Application Programming Interface, according to various embodiments of the present disclosure. As illustrated in FIG. 6, application 630 may initiate a request for a PIN by sending a request OMAPI extension 632 to open a secure session (operation 602).

At operation 604, OMAPI extension 632 may send a request to TUI 634 and secure element (SE) 636 to open a session. SE 636 may confirm to TUI 636 and OMAPI extension 632 that a session has been opened (operation 606). In operation 608, OMAPI extension 632 may return a handle to application 630.

Application 630 may request a PIN in operation 610. OMAPI extension 632 may receive the request for a PIN and may request a PIN via TUI 634 (operation 612). TUI 634, in response to the request, may setup a secure channel between TUI 634 and SE 636 (operation 614). SE 636 may confirm to TUI 634 that a secure channel is in place (operation 616). In operation 618, TUI 634 may collect the PIN. In operation 620 the PIN may be sent (e.g., encrypted and/or using APDU) to SE 636. In operation 622, TUI 634 may end the secure channel with SE 636. TUI 634 may then transmit via OMAPI extension 632 a message indicating that the PIN has been collected and transmitted (operation 624). OMAPI extension 632 may transmit to application 630 a message indicating that the PIN has been collected and transmitted (operation 626). At operation 628 application 630 may close the session with OMAPI extension 632.

Figure 7:
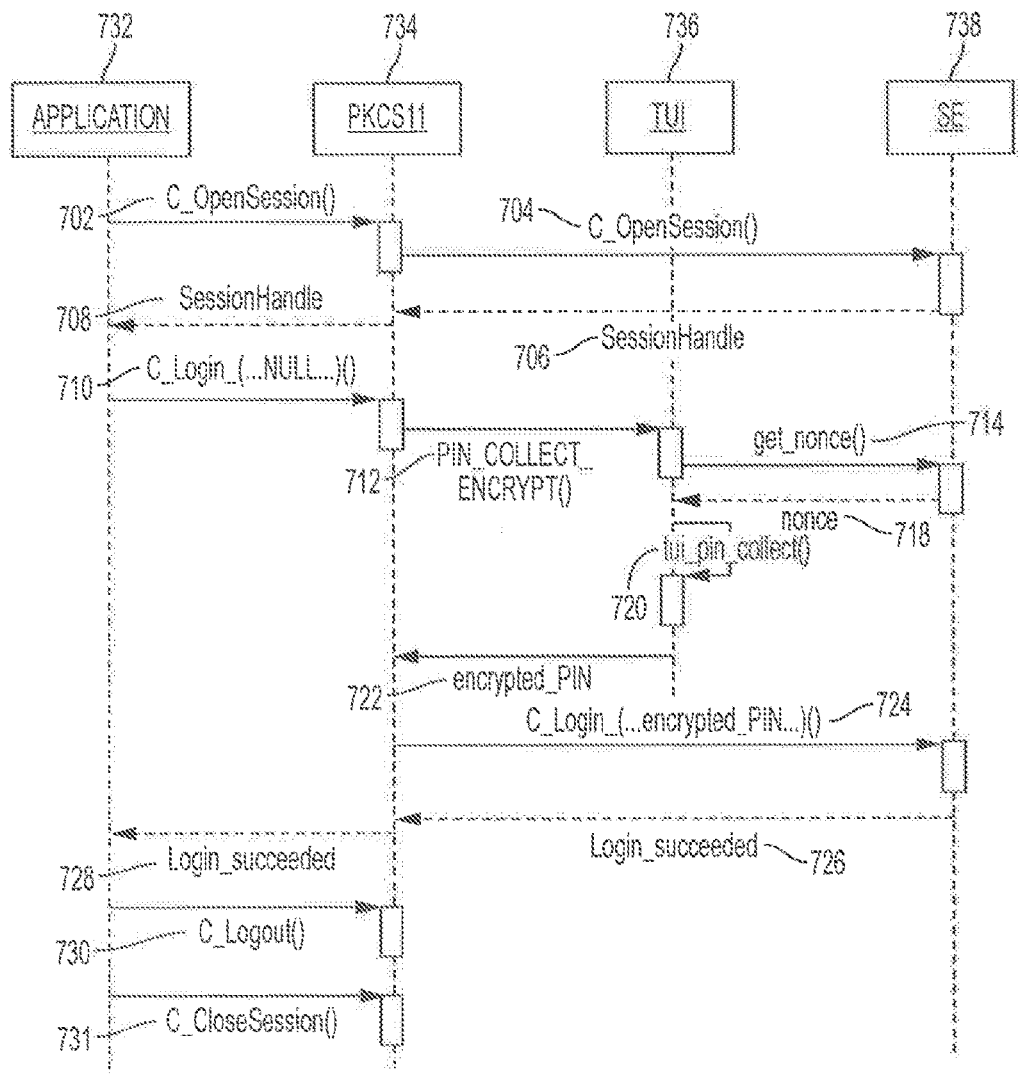
FIG. 7 illustrates flowchart for Personal Identification Number management using public key cryptography standards (PKCS), according to various embodiments of the present disclosure.

FIG. 7 illustrates a flowchart for Personal Identification Number management using public key cryptography standards (PKCS) (e.g., PKCS 11), according to various embodiments of the present disclosure.

In operation 702, application 732 may open a session to collect a PIN via PKCS11 734. PKCS11 734 may receive the open session request and forward it to TUI 734 (operation 704), and TUI 734 may forward the request to SE 738. SE 738 may return a session handle via TUI 736 to PKCS11 734 (operation 706). PKCS11 734 may return the session handle to application 732 in operation 708.

After receiving the session handle, application 732 may send a login request to PKCS11 734 (operation 710). PKCS11 734 may receive the login request and transmit a PIN collection request to TUI 736 (operation 712). In operation 714, TUI 736 may request a nonce from SE 738 and the nonce may be returned from SE 738 to TUI 736 in operation 718. A PIN may be collected by TUI 736 in operation 720. An encrypted PIN may be transmitted from TUI 736 via PKCS11 734 to SE 738 in operations 722 and 724. In operation 726, SE 738 may confirm to PKCS11 734 that a login succeeded. PKCS 11 734 may notify application 732 that a login succeeded in operation 728. In operation 730, application 732 may logout. In operation 731, application 732 may close the session.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method of a trusted execution environment (TEE) executing in a processor for securing a personal identification number (PIN) on a mobile device, the method comprising:
   receiving, in response to a request to access a secure element (SE) that is outside the TEE, a request from the SE for the PIN to access the SE;
   instantiating a trusted user interface (TUI) associated with the TEE;
   collecting the PIN via the TUI; and
   securely transmitting the PIN from the TEE to the SE,
   wherein the access to the SE is allowed in response to the SE receiving the PIN and is disallowed in response to the SE not receiving the PIN,
   wherein the secure transmitting of the PIN from the TEE to the SE comprises at least one of using a secure physical channel between the TEE and the SE, using a secure channel protocol between the TEE and the SE, or encrypting the PIN before transmitting the PIN from the TEE to the SE, and
   wherein the PIN is prevented from reaching an application operating outside the TEE and the SE.

2. The method of claim 1, wherein the SE comprises at least one of a process running in a microSD (secure digital non-volatile memory card), a process running in the TEE of the mobile device, a process resident on a subscriber identity module (SIM) card, a process resident on a universal integrated circuit card (UICC), an embedded security chip, or a process resident on a secured physical card.

3. The method of claim 1, wherein the secure transmission of the PIN comprises using the secure physical channel from the TEE of the mobile device to the SE.

4. The method of claim 1, wherein the secure transmission of the PIN comprises using the secure channel protocol from the TEE of the mobile device to the SE.

5. The method of claim 1, wherein the secure transmission of the PIN comprises the encrypting of the PIN prior to transmission.

6. The method of claim 5, wherein the PIN is encrypted using a public key of the SE.

7. The method of claim 6, wherein the PIN is transmitted using public key cryptography standards (PKCS).

8. The method of claim 5, wherein the PIN is encrypted using a symmetric key shared between the TEE and the SE.

9. The method of claim 8, wherein the encryption and transmission of the PIN are handled by a secure channel manager of the TEE.

10. The method of claim 1, wherein the SE and the TEE communicate using an application protocol data unit (APDU).

11. The method of claim 10, wherein the APDU transmission is handled by the TEE.

12. The method of claim 10, wherein the APDU transmission is handled by an APDU service external to the TEE.

13. The method of claim 1, further comprising:
    requesting, via the TUI, sending of a nonce from the SE; and
    receiving, at a secure channel manager of the TEE, the nonce sent from the SE,
    wherein the secure transmission of the PIN to the SE includes sending the nonce from the TEE to the SE.

14. The method of claim 1, wherein the TEE comprises one or more of a secure operating system or dedicated secure hardware.

15. The method of claim 1, wherein the request for the PIN is received via extended open mobile application programming interface (OMAPI).

16. The method of claim 1, wherein the request for the PIN is received from an application outside of the TEE.

17. The method of claim 1, wherein the TUI and the TEE are connected via a secure physical channel.

18. The method of claim 1, wherein the SE comprises at least one of a process running in a secure digital non-volatile memory (microSD) card, a process running in the TEE, a process resident on a subscriber identity module (SIM) card, a process resident on a universal integrated circuit card (UICC), or a process resident on a secured physical card.

19. An apparatus for securing a personal identification number (PIN) on a mobile device, the apparatus comprising:
    a memory configured to store executable instructions for executing a trusted execution environment (TEE);
    a secure element (SE); and at least one processor configured to execute the stored instructions to:
  receive, in response to a request to access the SE, a request for the PIN to access the SE,
  instantiate a trusted user interface (TUI) associated with the TEE,
  collect the PIN via the TUI, and
  securely transmit the PIN from the TEE to the SE,
wherein the SE is outside the TEE,
wherein the access to the SE is allowed in response to the SE receiving the PIN and is disallowed in response to the SE not receiving the PIN,
wherein the secure transmitting of the PIN from the TEE to the SE comprises at least one of using a secure physical channel between the TEE and the SE, using a secure channel protocol between the TEE and the SE, or encrypting the PIN before transmitting the PIN from the TEE to the SE, and
wherein the PIN is prevented from reaching an application operating outside the TEE and the SE.

20. The apparatus of claim 19, wherein the SE comprises at least one of a process running in a microSD (secure digital non-volatile memory card), a process running in the TEE of the mobile device, a process resident on a subscriber identity module (SIM) card, a process resident on a universal integrated circuit card (UICC), an embedded security chip, or a process resident on a secured physical card.

21. The apparatus of claim 19, wherein the secure transmission of the PIN comprises using the secure physical channel from the TEE of the mobile device to the SE.

22. The apparatus of claim 19, wherein the secure transmission of the PIN comprises using the secure channel protocol from the TEE of the mobile device to the SE.

23. The apparatus of claim 19, wherein the secure transmission of the PIN comprises the encrypting of the PIN prior to transmission.

24. The apparatus of claim 23, wherein the PIN is encrypted using a public key of the SE.

25. The apparatus of claim 24, wherein the PIN is transmitted using public key cryptography standards (PKCS).

26. The apparatus of claim 23, wherein the PIN is encrypted using a key shared between the TEE and the SE.

27. A non-transitory computer-readable storage medium storing instructions for executing a trusted execution environment (TEE) that, when executed, cause at least one processor to:
  receive, in response to a request to access a secure element (SE) that is outside the TEE, a request for a personal identification number (PIN) from the secure element to access the SE;
  instantiate a trusted user interface (TUI) associated with the TEE;
  collect the PIN via the TUI; and
  securely transmit the PIN from the TEE to the SE,
wherein the request for the PIN is in response to a request for access to the SE,
wherein the access to the SE is allowed in response to the SE receiving the PIN and is disallowed in response to the SE not receiving the PIN,
wherein the secure transmitting of the PIN from the TEE to the SE comprises at least one of using a secure physical channel between the TEE and the SE, using a secure channel protocol between the TEE and the SE, or encrypting the PIN before transmitting the PIN from the TEE to the SE, and
wherein the PIN is prevented from reaching an application operating outside the TEE and the SE.

28. The non-transitory computer-readable storage medium of claim 27, wherein the SE comprises at least one of a process running in a microSD (secure digital non-volatile memory card), a process running in the TEE of the mobile device, a process resident on a subscriber identity module (SIM) card, a process resident on a universal integrated circuit card (UICC), an embedded security chip, or a process resident on a secured physical card.

29. The non-transitory computer-readable storage medium of claim 27, wherein the secure transmission of the PIN comprises using the secure physical channel from the TEE of the mobile device to the SE.

30. The non-transitory computer-readable storage medium of claim 27, wherein the secure transmission of the PIN comprises using the secure channel protocol from the TEE of the mobile device to the SE.

31. The non-transitory computer-readable storage medium of claim 27, wherein the secure transmission of the PIN comprises the encrypting of the PIN prior to transmission.

* * * * *